(12) United States Patent
Cudak et al.

(10) Patent No.: US 10,095,503 B2
(45) Date of Patent: Oct. 9, 2018

(54) FILE USABILITY BASED ON A SYSTEM CONFIGURATION

(71) Applicant: LENOVO Enterprise Solutions (Singapore) PTE. LTD., New Tech Park (SG)

(72) Inventors: Gary D. Cudak, Wake Forst, NC (US); Nagananda Chumbalkar, Raleigh, NC (US); Nathan J. Peterson, Durham, NC (US)

(73) Assignee: LENOVO ENTERPRISE SOLUTIONS (SINGAPORE) PTE. LTD., New Tech Park (SG)

( * ) Notice: Subject to any disclaimer, the term of this patent is extended or adjusted under 35 U.S.C. 154(b) by 38 days.

(21) Appl. No.: 15/151,371

(22) Filed: May 10, 2016

(65) Prior Publication Data

US 2017/0329595 A1    Nov. 16, 2017

(51) Int. Cl.
| | |
|---|---|
| *G06F 9/44* | (2018.01) |
| *G06F 8/65* | (2018.01) |
| *H04L 12/58* | (2006.01) |
| *H04L 29/08* | (2006.01) |
| *G06F 17/30* | (2006.01) |
| *G06F 8/71* | (2018.01) |

(52) U.S. Cl.
CPC ............... *G06F 8/65* (2013.01); *G06F 8/71* (2013.01); *G06F 17/30076* (2013.01); *G06F 17/30106* (2013.01); *H04L 51/04* (2013.01); *H04L 51/08* (2013.01); *H04L 67/06* (2013.01)

(58) Field of Classification Search
None
See application file for complete search history.

(56) References Cited

U.S. PATENT DOCUMENTS

| | | | |
|---|---|---|---|
| 7,945,616 B2* | 5/2011 | Zeng | H04L 29/06 709/202 |
| 8,645,466 B2* | 2/2014 | Motes | G06F 3/0482 709/204 |
| 2008/0091845 A1* | 4/2008 | Mills | G06F 17/30902 709/246 |

OTHER PUBLICATIONS

Klynt, Media Library: Convert My Media Files to a Supported Format, http://support.klynt.net/customer/en/portal/articles/182218-2-prepare-your-medias, Last Visited Mar. 22, 2016, Last updated Jul. 16, 2015, p. 1-7.

* cited by examiner

*Primary Examiner* — Qamrun Nahar
(74) *Attorney, Agent, or Firm* — Kunzler, PC.

(57) ABSTRACT

Apparatuses, systems, methods, and program products are disclosed for file usability based on a system configuration. A user module determines a recipient of a file that is distributed to the recipient by a sender. A system module determines a configuration of a recipient's system. An action module performs one or more compatibility actions associated with a file in response to determining that the file is not compatible with the recipient's system configuration. A compatibility action includes an action related to usability of the file on the recipient's system. A compatibility action is performed on a sender's system prior to the sender distributing a file to a recipient.

18 Claims, 5 Drawing Sheets

FILE USABILITY BASED ON A SYSTEM CONFIGURATION

FIELD OF THE INVENTION

The subject matter disclosed herein relates to using files on a device and more particularly relates to determining whether a file is usable on a device based on a configuration of the device.

BACKGROUND

Files such as documents are a primary form of creating, storing, and providing information. Files may be shared with one or more recipients using a shared folder or directory, or via an electronic communication such as email. Various software applications may be used to create files and store them in specific formats. Further, many applications may offer specific features for presenting certain types of information in various ways.

BRIEF SUMMARY

Apparatuses, systems, methods, and program products are disclosed for file usability based on a system configuration is disclosed. An apparatus, in one embodiment, includes a user module that determines a recipient of a file that is being distributed to the recipient by a sender. In a further embodiment, an apparatus includes a system module that determines a configuration of a recipient's system. In some embodiments, an apparatus includes an action module that performs one or more compatibility actions associated with a file in response to determining that the file is not compatible with a recipient's system configuration.

In one embodiment, a compatibility action includes an action related to usability of a file on a recipient's system. In certain embodiments, a compatibility action is performed on a sender's system prior to a sender distributing a file to a recipient. In a further embodiment, an apparatus includes a compatibility module that determines whether a file is compatible with a recipient's system configuration.

In certain embodiments, a compatibility module determines one or more characteristics of a file. In some embodiments, a compatibility module determines one or more configuration settings of a recipient's system. In one embodiment, a compatibility module compares one or more characteristics of a file with one or more configuration settings of a recipient's system to determine whether the one or more characteristics of the file is compatible with the one or more configuration settings of the recipient's system.

In some embodiments, one or more characteristics of a file include one or more of formatting settings for content within the file, types of content embedded in the file, and a file extension for the file. In various embodiments, one or more configuration settings of a recipient's system include one or more of hardware level settings, operating system level settings, application level settings, graphics settings, and network settings. In certain embodiments, a system module determines a configuration of a recipient's system by one or more of requesting a configuration report from the recipient's system, checking a recipient configuration profile associated with a directory service, and checking a history of file distributions associated with a recipient.

In certain embodiments, a user module determines a recipient by checking one or more of a list of previously selected recipients, an email recipient list, an access control list associated with a shared folder where a file is stored, a user-generated list, a predefined contacts group associated with a sender, and an organization group defined by a directory service.

In one embodiment, a recipient is one of a plurality of intended recipients for a file. In such an embodiment, a system module determines one or more system configuration settings that are common for each recipient of a plurality of intended recipients. In various embodiments, one or more common configuration settings are used to determine one or more compatibility actions to perform on a file to make the file compatible with each intended recipients' systems.

In some embodiments, a compatibility action includes modifying one or more of formatting settings for content within a file, types of content embedded in a file, and a file extension of a file to make a file usable on a recipient's system. In a further embodiment, a compatibility action includes creating a plurality of different versions of a file where a version of the file corresponds to a version of a software application on a recipient's system used to access the file.

In certain embodiments, a compatibility action includes presenting a notification to a sender that one or more characteristics of a file are not compatible with one or more configuration settings of a recipient's system. In one embodiment, a compatibility action includes presenting one or more recommendations for modifying one or more characteristics of a file to make a file compatible with one or more configuration settings of a recipient's system.

In various embodiments, one or more recommendations for modifying one or more characteristics of a file to make the file compatible with one or more configuration settings of a recipient's system are presented in real-time while a sender edits the file. In certain embodiments, an action module performs a compatibility action in response to one or more of a sender editing the file, a file being saved, a file being attached to an email, and an email that a file is attached to being sent.

A method, in one embodiment, includes determining, by use of a processor, a recipient of a file that is being distributed to the recipient by a sender. In a further embodiment, a method includes determining a configuration of a recipient's system. In some embodiments, a method includes performing one or more compatibility actions associated with a file in response to determining that the file is not compatible with a recipient's system configuration.

In one embodiment, a compatibility action includes an action related to usability of a file on a recipient's system. In certain embodiments, a compatibility action is performed on a sender's system prior to a sender distributing a file to a recipient. In a further embodiment, a method includes determining whether a file is compatible with a recipient's system configuration.

In some embodiments, a method includes determining whether a file is compatible with a recipient's system configuration by determining one or more characteristics of the file, determining one or more configuration settings of a recipient's system, and comparing the one or more characteristics of the file with the one or more configuration settings of the recipient's system to determine whether the one or more characteristics of the file is compatible with the one or more configuration settings of the recipient's system.

In certain embodiments, a method includes determining a configuration of a recipient's system includes one or more of requesting a configuration report from a recipient's system, checking a recipient configuration profile associated with a directory service, and checking a history of file distributions associated with a recipient. In certain embodiments, a compatibility action includes modifying one or more of formatting settings for content within a file, types of content embedded in a file, and a file extension of a file to make the file usable on the recipient's system.

In some embodiments, a compatibility action includes creating a plurality of different versions of a file where a version of the file corresponds to a version of a software application on a recipient's system used to access the file. In certain embodiments, a compatibility action includes presenting a notification to a sender that one or more characteristics of a file are not compatible with one or more configuration settings of a recipient's system.

A program product, in one embodiment, includes a computer readable storage medium that stores code executable by a processor. The executable code, in one embodiment, includes code to perform determining a recipient of a file that is being distributed to the recipient by a sender. In a further embodiment, the executable code includes code to perform determining a configuration of a recipient's system. In some embodiments, the executable code includes code to perform performing one or more compatibility actions associated with a file in response to determining that the file is not compatible with a recipient's system configuration. In one embodiment, a compatibility action includes an action related to usability of a file on a recipient's system. In certain embodiments, a compatibility action is performed on a sender's system prior to a sender distributing a file to a recipient.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
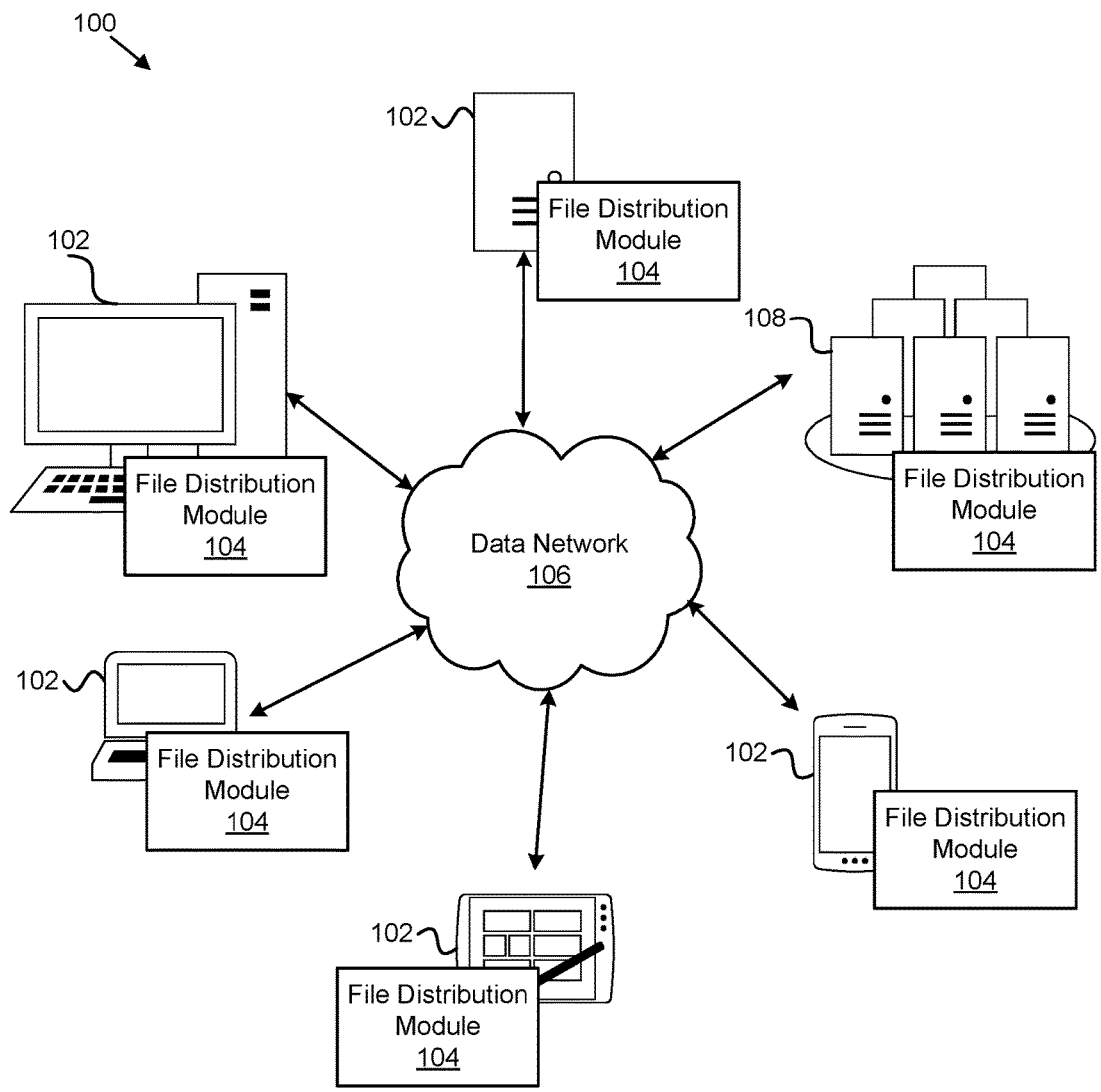
FIG. 1 is a schematic block diagram illustrating one embodiment of a system for file usability based on a system configuration.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for file usability based on a system configuration. In one embodiment, the system 100 includes one or more information handling devices 102, one or more file distribution modules 104, one or more data networks 106, and one or more servers 108. In certain embodiments, even though a specific number of information handling devices 102, file distribution modules 104, data networks 106, and servers 108 are depicted in FIG. 1, one of skill in the art will recognize, in light of this disclosure, that any number of information handling devices 102, file distribution modules 104, data networks 106, and servers 108 may be included in the system 100.

In one embodiment, the system 100 includes one or more information handling devices 102. The information handling devices 102 may include a desktop computer, a laptop computer, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, or another computing device including a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium. As used herein, an information handling device 102 may also be known as a client device, a sender device, a recipient device, and/or the like.

In certain embodiments, the information handling devices 102 are communicatively coupleable to one another and/or to one or more servers 108 over a data network 106, described below. The information handling devices 102, in a further embodiment, are capable of executing various firmware, programs, program code, applications, instructions, functions, and/or the like, and may access, store, download, upload, and/or the like data located on one or more servers 108. In some embodiments, the information handling devices 102 are configured to send and receive files from one or more different information handling devices 102, modify files, store files locally and/or in remote locations, and/or the like.

In one embodiment, the file distribution module 104 is configured to determine a recipient of a file that is being distributed to the recipient by a sender (e.g., the sender may send a file attached to an email to a recipient, the sender may store a file in a shared folder that is accessible by the recipient, and/or the like). In some embodiments, the file distribution module 104 is configured to determine a configuration of a recipient's system, which may include determining various hardware specifications, operating system specifications, software specifications, and/or the like of the recipient's system.

In certain embodiments, based on the recipient's system configuration, the file distribution module 104 is further configured to perform one or more compatibility actions associated with the file in response to determining that the file is not compatible with the recipient's system configuration. A compatibility action may include an action related to the usability of the file on the recipient's system and may be performed on the sender's system prior to the sender distributing the file to the recipient.

The file distribution module 104, in one embodiment, improves the functioning of the computer and/or the computer technology in general, and improves the usability of the computer technology, by determining whether a recipient's system is compatible with a file that is being distributed to the recipient before the recipient receives the file. In this manner, the file distribution module 104, the sender, or the sender's system, can adjust or modify the file's settings, for example, before the file is sent to the recipient, which improves the efficiency of distributing files by reducing the amount of communication between the sender and receiver to verify that the file is compatible with the recipient's system, and prevents frustration on the part of the recipient when the recipient attempts to open a received file and cannot use it because the recipient's system configuration is not compatible with the file.

In various embodiments, the file distribution module 104 may be embodied as a hardware appliance that can be installed or deployed on an information handling device 102, on a server 108, or elsewhere on the data network 106. In certain embodiments, a file distribution module 104 may include a hardware device such as a secure hardware dongle or other hardware appliance device (e.g., a set-top box, a network appliance, or the like) that attaches to a device, a laptop computer, a server 108, a tablet computer, a smart phone, or the like, either by a wired connection (e.g., a USB connection) or a wireless connection (e.g., Bluetooth®, Wi-Fi®, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the file distribution module 104 may include a power interface, a wired and/or wireless network interface, a graphical interface that attaches to a display, and/or a semiconductor integrated circuit device as described below, configured to perform the functions described herein with regard to the file distribution module 104.

The file distribution module 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the file distribution module 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the file distribution module 104.

The semiconductor integrated circuit device or other hardware appliance of the file distribution module 104, in certain embodiments, includes and/or is communicatively coupled to one or more volatile memory media, which may include but is not limited to: random access memory ("RAM"), dynamic RAM ("DRAM"), cache, or the like. In one embodiment, the semiconductor integrated circuit device or other hardware appliance of the file distribution module 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more servers 108, in one embodiment, may be embodied as blade servers, mainframe servers, tower servers, rack servers, and/or the like. The one or more servers 108 may be configured as a mail server, a web server, an application server, an FTP server, a media server, a data server, a web server, a file server, a virtual server, and/or the like. In certain embodiments, the one or more servers 108 store files such as text documents, spreadsheets, portable document format ("PDF") files, emails, audio files, video files, source code, and/or the like, which may be accessed by the file distribution module 104, a sender's system, a recipient's system, and/or the like. In some embodiments, the one or more servers 108 may be located on an organization's premises, in a data center, in the cloud, and/or the like. The one or more servers 108 may be accessed remotely over a data network 106 like the Internet, or locally over a data network 106 like an intranet.

Figure 2:
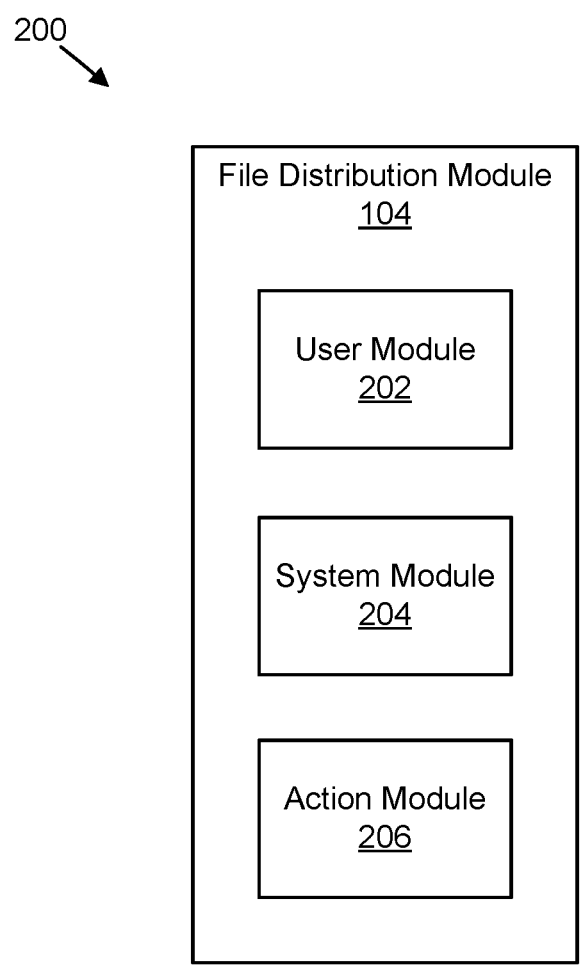
FIG. 2 is a schematic block diagram illustrating one embodiment of an apparatus for file usability based on a system configuration.

FIG. 2 depicts one embodiment of an apparatus 200 for file usability based on a system configuration. The apparatus 200 may include an embodiment of a file distribution module 104. In one embodiment, the file distribution module 104 includes one or more of a user module 202, a system module 204, and an action module 206, which are described in more detail below.

The user module 202, in one embodiment, is configured to determine a recipient of a file. As used herein, a file may include a text document, a spreadsheet, a PDF file, an audio file, a video file, an image file, a webpage, a source code file, and/or the like. A recipient, as used herein, may include user that is an intended recipient of the file such as an email recipient, a user that has access to a shared folder where the file may be stored, an instant message recipient, a text message recipient, a social networking friend, and/or the like. A recipient may be identified using an identifier such as a name, an email address, an IP address, a MAC address, a unique identifier, an Active Directory® identifier, and/or the like.

In one embodiment, the user module 202 determines a user that is an intended recipient of a file by checking an email/instant message/text message recipient list. For example, the user module 202 may check an email recipient list in response to the sender attaching a file to an email that is intended for one or more recipients. In some embodiments, the user module 202 determines a recipient of the file by checking a user list associated with a directory/folder where the file is stored. For example, the user module 202 may check an access control list ("ACL") for a folder where the file is stored to see which users have access to the folder and the files in the folder.

In a further embodiment, the user module 202 determines a recipient for a file based on a previous distribution of the file or a file similar to the file being distributed. For example, the user module 202 may track who the file has been distributed to in the past. Similarly, the user module 202 may determine that the file is similar to other files that have been distributed in the past and may determine one or more possible recipients of the file based on previous distributions of similar files. The user module 202 may determine whether a file being distributed is similar to a previously distributed file based on the file's extension (e.g., ".docx," ".txt," ".mp3," ".pdf," or the like), based on content within the file, based on the location of the file, and/or the like.

In some embodiments, the user module 202 determines a recipient for the file based on a group defined by a directory service for an organization, such as Active Directory®. For example, the user module 202 may determine a recipient from a predefined group within the sender's organization in response to the sender selecting the group, or a user within the group, to be a recipient of the file. Similarly, the user module 202 may determine a recipient for the file from a sender-defined group, such as a predefined contact group, email group, or the like, that the sender selects to send the file to.

In one embodiment, the user module 202 presents a list of possible recipients for the file to the sender, which the sender can select from to send the file to. For example, after the sender attaches a file to an email, the user module 202 may present one or more potential recipients for the file based on a distribution history of the file, a distribution history of similar files, a user list associated with a location where the file is stored, and/or the like. A distribution history may refer to one or more recipient's that the file, or similar files, has been previously distributed to. In another example, the user module 202 may present a list of potential recipients to the sender in real-time while the sender is editing a file. For example, the user module 202 may present a list of potential recipients to the sender while the sender is editing a spreadsheet file, a text document, an image, and/or the like.

In certain embodiments, the user module 202 stores recipient information associated with the distribution of a file. For example, the user module 202 may store recipient information in metadata associated with the file, in a separate file at an accessible network location, in metadata associated with an email program used to send the file, and/or the like. The user module 202 may refer to the stored recipient information when the file, or a similar file, is being distributed in the future.

In one embodiment, the user module 202 determines the recipient from a plurality of recipients that the file is being distributed to. For example, the recipient may be listed as one of a plurality of email recipients intended to receive the file as an email attachment. In another example, the recipient may be one of a plurality of recipients that are listed on an access control list for a shared directory. The recipient may also be one of a plurality of recipients that have been assigned to a predefined group such as a contact group, a directory service group, and/or the like.

The system module 204, in one embodiment, is configured to determine a configuration of the recipient's system. As used herein, a system configuration may describe various specifications, characteristics, settings, and/or the like of a recipient's system including, but not limited to, hardware specifications, operating system specifications, software specifications, network specifications, graphic specifications, and/or the like. For example, a recipient's system configuration may include the processor and memory types, the operating system version, and various software versions that are installed on the system.

In one embodiment, the system module 204 determines a recipient's system configuration by requesting a system configuration report from the recipient's system. For example, the system module 204 may request a system configuration report from the recipient system, and the recipient system may perform a system audit to determine system information to send to the system module 204. For example, if a sender is emailing a Microsoft Word 2010® file to a recipient, the system module 204 may request from the recipient's system information about the operating system that the recipient's system is running and information associated with any programs that may be able to open and use the Microsoft Word 2010® file. In one embodiment, the system module 204 determines the recipient's system configuration in response to the user module 202 determining a recipient of a file.

The recipient system's configuration report may be generated before a request is received for the report and stored on the recipient's system or in a central repository (e.g., in the cloud) so that it can be quickly sent to the system module 204 upon the system module's 204 request or accessed by the system module 204 without sending a request to the recipient system. In certain embodiments, the system module 204 periodically polls or requests a new system configuration report from a recipient (based on a previous email recipient list or current ACL for a shared directory, for example), and maintains a table of system configurations for each recipient. In some embodiments, the system module 204 receives a configuration report from a recipient's system in response to change in the recipient's system configuration. For example, if a new software application is installed on the recipient's system, the recipient's system may send a configuration report to the system module 204. In such an embodiment, a portion of the system module 204 may be located on the recipient's system (e.g., as an application plugin for Outlook®, Active Directory®, etc.; as a service; or the like), to monitor for system configuration changes, perform system audits, generate configuration reports, or the like.

In a further embodiment, the system module 204 determines a recipient's system configuration based on an operating system image installed on the recipient's system. For example, the recipient system may be running a preconfigured operating system image, such as a virtual machine image, that includes Microsoft Windows 8® and one or more software applications such as Microsoft Office 2013®, Adobe Reader® 7.1, Google Chrome® v. 49.0.1, or the like that are pre-installed as part of the image. In some embodiments, the operating system image may include an identifier that the system module 204 may use to look up a system configuration of the operating system image from a central repository, an application repository, a directory service, or the like.

In certain embodiments, the system module 204 determines a recipient's system configuration by determining software associated with or installed on the recipient's system when the recipient's system is manufactured, sold, setup or configured by an administrator, or the like. The system module 204 may determine information regarding the recipient's computer manufacturer, model, year, serial number, or the like. Based on the system information, the system module 204 may look up a system configuration for the recipient's system. For example, the system module 204 may determine that the recipient is using a Lenovo Ideapad® Y580 computer. The system module 204 may look up a system configuration for the particular computer the recipient is using (e.g., by checking the manufacturer's webpage, checking a list of configurations for various systems maintained locally or stored on a central repository of an organization, or the like).

In some embodiments, the system module 204 determines a recipient's system configuration by checking a directory service, e.g., Active Directory®, to get information regarding the recipient and the recipient's system. For example, each employee of an organization may register their smart phone, laptop computer, or the like, with the directory service maintained by the organization. Registration may include storing system configuration for an employee's system, such as the operating system being used and various applications installed on the system. The system module 204 may look up a recipient in the directory service, based on the recipient's identifier, to determine the system configuration of the recipient's system.

In some embodiments, the system module 204 creates and maintains a cross-reference table based on previous communications or interactions with the recipient. In one embodiment, the system module 204 determines types of files that are sent from the recipient to the sender to determine which applications the recipient has installed on his/her system. For example, if the sender receives an email from the recipient with a Microsoft Word 2010® file attached, the system module 204 may generate an entry in the table for the recipient to note that the recipient probably has Microsoft Word 2010® installed. Similarly, the system module 204 may determine that a recipient has accessed PDF files stored in a shared folder in the past, and therefore likely has a PDF application installed that can open PDF files. In one embodiment, the system module 204 determines the recipient's system configuration by communicating with the recipient's computer, smartphone, or other computing device without the recipient's involvement. In another embodiment, the system module 204 determines the recipient's system configuration without any action by the user or the recipient.

In one embodiment, the action module 206 is configured to perform one or more compatibility actions associated with the file in response to determining that the file is not compatible with the recipient's system configuration. As used herein, a compatibility action may be an action performed on the file, or an action associated with the file, that is related to the usability of the file on the recipient's system such as modifying one or more of the file's settings, notifying a user that the file is incompatible with the recipient's system, or the like.

In certain embodiments, the compatibility action includes an action that modifies one or more settings of the file. In one embodiment, the action module 206 changes a file's extension so that it is useable by a recipient that does not have an application installed that can open the file with the original extension. For example, the action module 206 may change the extension of a Microsoft Word® document from ".docx" to the previously used ".doc" in the event that the recipient has an older version of Microsoft Word® installed, as would be determined by the system module 204.

In some embodiments, the action module 206 changes one or more settings associated with the content in the file. For example, if the file is a text document that contains content formatted using a particular font, but the system module 204 determines that the recipient's system does not have the font installed, the action module 206 may change the font used for the content to a different font that the recipient has installed on his/her system. In another example, if the text document has a Microsoft Excel® spreadsheet embedded in the content, and the system module 204 determines that the recipient does not have Microsoft Excel® installed on his/her system, the action module may change the embedded spreadsheet to an image so that the recipient can view the spreadsheet when the text document is opened.

In one embodiment, the action module 206 creates or saves a plurality of different versions/formats of the file so that the file is compatible with various versions of software used to open the file. For example, if a file is created with Microsoft Word 2016®, the action module 206 may create different versions of the file to be compatible with other versions of Microsoft Word®, such as Microsoft Word 2013®, Microsoft Word 2010®, Microsoft Word 2007®, Microsoft Word 2003®. Similarly, the action module 206 may create a PDF version of the file, may save the document as an image file, and/or the like. In this manner, recipients that have various system configurations may still be able to access, view, and use and the file even though the original file may not have been compatible with their systems.

In some embodiments, the compatibility action includes an action that is associated with the usability of the file on the recipient's system. In one embodiment, the action module 206 presents one or more notifications to the sender that one or more characteristics of the file are not compatible with a recipient's system configuration. For example, as a user is editing a text document, the action module 206 may display a warning, in real-time, stating that a selected text style is not installed on Recipient A's system, and therefore the text document may not be usable on Recipient A's system. In another example, the sender may attach a PDF file to an email being sent to Recipient A, and the action module 206 may display a message stating that Recipient A does not have a PDF viewer/reader installed on his system, and therefore Recipient A may not be able to view the file. Based on this information, the sender may be able to act accordingly to modify the file, select a different version/format of the file, or the like, that is compatible with the recipient's system.

In some embodiments, the action module 206 provides one or more recommendations for modifying one or more of the file's settings to make the file compatible with the recipient's system configuration. For example, as the sender is editing a text file, the action module 206, in real-time, may present one or more recommendations for making the file compatible with Recipient A's system, Recipient B's system, and so on. The recommendations, for example, may include saving the file in a particular version/format, changing or using various formatting settings, and/or the like that correspond to one or more recipients' system configurations. The action module 206 may present recommendations on a per-recipient basis. For example, if three recipients are listed as recipients of an email, the action module 206 may present recommendations separately for each recipient.

In some embodiments, the action module 206 calls out portions of the file contents that may not be compatible with a recipient's system configuration. For example, the action module 206 may highlight content, draw a border around content, insert a comment in the file associated with content, and/or the like to draw the sender's attention to the file content that may not be compatible with the recipient's system configuration. For instance, as a sender is editing a text file, the action module 206 may highlight a table inserted in the file and present a message that the table format is not compatible with Recipient B's system.

In some embodiments, the action module 206 highlights or otherwise calls out a recipient's name to let the sender know that a file may not be compatible with the recipient's system. For example, if the sender attaches a file to an email being sent to a plurality of recipients, the action module 206 may highlight Recipient C's name, and optionally present a message, to let the sender know that the file is not compatible with Recipient C's system, and may also specify in the message what the incompatibility issues are. Similarly, as the sender is editing a file, the action module 206 may highlight or present a user's name that is associated with the file, or that may be an intended recipient of the file, to let the sender know that the file may not be compatible with the recipient's system, and also let the sender know what the incompatibility issues with the file might be.

In one embodiment, the action module 206 performs the compatibility action in response while the file is being edited, while the file is being save, when the file is attached to an email, when the email the file is attached to is sent, and/or the like. For example, the action module 206 may highlight one or more portions of a text document that may be incompatible with Recipient A's system in real-time while the sender is editing the file; the action module 206 may create multiple formats of the file in a shared folder where the file is stored when the sender saves the file in the shared folder; the action module 206 may notify the sender that a file being attached to an email is not in a format that Recipient A can use in response to the file being attached to the email or when the email with the attached file is being sent.

In some embodiments, the action module 206 performs the compatibility action on a per file or per user basis. A per file basis, as described above, may include creating multiple versions/formats of the file in a shared directory. A per user basis, for example, may include changing content formatting settings of a document attached to an email specifically for each recipient in an email recipient list.

In certain embodiments, a recipient is one of a plurality of recipients that are part of a distribution list such as an email recipient list/group, a group defined by a directory service, a list of users on an ACL for a shared directory, or the like. In some embodiments, the system module 204 determines a system configuration for each recipient on the distribution list, and further determines one or more system configuration settings each recipient has in common. The action module 206 may then determine one or more compatibility action to perform on the file to make the file compatible on each of the recipients' systems.

For example, if the user module 202 determines that five recipients are on an ACL for a shared directory, the system module 204 may determine the system configurations for each recipient and one or more system configuration settings that each recipient has in common. For instance, each recipient may have a copy of Microsoft Word 2010® installed on their systems. In this example, the sender may be editing a document to be saved in the shared directory using Microsoft Word 2013®. Because the file the sender is editing is being created with a different version of Microsoft Word® than the recipients have installed, the action module 206 may perform one or more actions associated with the file such that the file is usable on the recipients' systems. The action module 206, for instance, may notify the sender that the recipients don't have Microsoft Word 2013® installed, may highlight one or more portions of the file that may be problematic for the recipients' use of the file, may provide one or more recommendations for editing the file to make it compatible with Microsoft Word 2010®, may save an additional copy of the file in the shared directory in a Microsoft Word 2010® format, and/or the like.

In one embodiment, the action module 206 performs the compatibility action on the sender's system prior to the file being distributed by the sender to the recipient. For example, the action module 206 may create various versions of a file before it is saved in a shared location, or the action module 206 may modify a style setting of the file before it is sent to an email recipient. In this manner, the recipient is not presented with a broken or incomplete file, a warning, a message, or the like that the file will not be opened correctly or cannot be opened on his/her system, which eliminates the recipient's frustration in trying to find a suitable program to open the file with, eliminates unnecessary communications between the recipient and the sender to try to fix the problem with the file, and/or the like.

Figure 3:
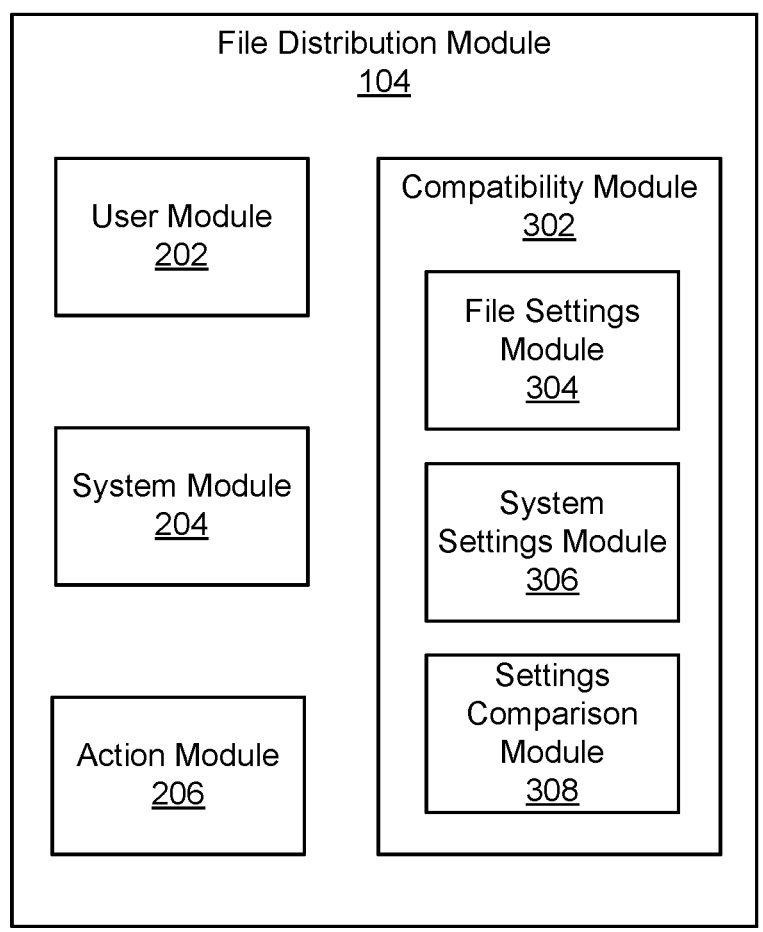
FIG. 3 is a schematic block diagram illustrating one embodiment of another apparatus for file usability based on a system configuration.

FIG. 3 depicts one embodiment of an apparatus 300 for file usability based on a system configuration. In one embodiment, the apparatus 300 includes an embodiment of a file distribution module 104. The file distribution module 104, in one embodiment, includes one or more of a user module 202, a system module 204, and an action module 206, which may be substantially similar to the user module 202, the system module 204, and the action module 206 described above with reference to FIG. 2. The file distribution module 104 may also include a compatibility module 302, which may include one or more of a file settings module 304, a system settings module 306, and/or a settings comparison module 308, which are described in more detail below.

The compatibility module 302, in one embodiment, is configured to determine whether the file is compatible with the recipient's system configuration determined by the system module 204. The file settings module 304, in one embodiment, is configured to determine one or more settings of the file being distributed to the recipient. The file settings module 304, for instance, may determine various settings for content in the file, such as formatting settings (e.g., font settings, font types, text styles, and/or other rich text formatting), the file's extension, whether the file includes embedded content and the types of the embedded content, various codecs or encodings for the file, and/or the like. The file settings module 304 may check metadata stored or associated with the file to determine one or more of the file's settings. In some embodiments, the file settings module 304 parses the file, to determine various content settings in the file.

In one embodiment, the system settings module 306 is configured to determine one or more configuration settings of the recipient's system. In some embodiments, the system settings module 306 checks a recipient system's configuration report to determine one or more settings of the recipient's system. The system settings module 306 may determine one or more settings for the recipient's system at various levels, including at a hardware level, an operating system level, an application level, or the like.

For example, the system settings module 306 may determine the amount of memory or storage capacity that the recipient's system has, the processor type and speed, the graphics capabilities of the graphics card/processor, the network interface speed, and/or the like; an operating system type and version of the operating system that is installed on the recipient system; the software applications and versions of software applications that are installed on the recipient system; one or more individual features or settings of each application installed on the system (such as which fonts are installed, which features are enabled, or the like); and/or the like.

The settings comparison module 308, in one embodiment, is configured to compare the one or more file settings/characteristics with the one or more configuration settings of the recipient's system to determine whether the file is compatible with the recipient's system. For example, if the sender wants to send the recipient a PDF file that includes inactive fields for the recipient to fill in with data, the file settings module 304 may determine that the file is a PDF file with interactive form fields, the system settings module 306 may determine whether the recipient's system has an application installed for opening PDF files, and if so, whether the application is capable of presenting interactive form fields and receiving input from the recipient in the form fields. Thereafter, the settings comparison module 308 would compare the file settings and the system settings to determine whether the file is compatible (e.g., able to be opened, viewed, used, or the like) with the recipient's system. If not, the compatibility module 302 may notify the action module 206 that the file is incompatible with the recipient's system configuration, and may notify the action module 206 what the issues may be. Otherwise, the file may be sent as usual to the recipient.

Figure 4:
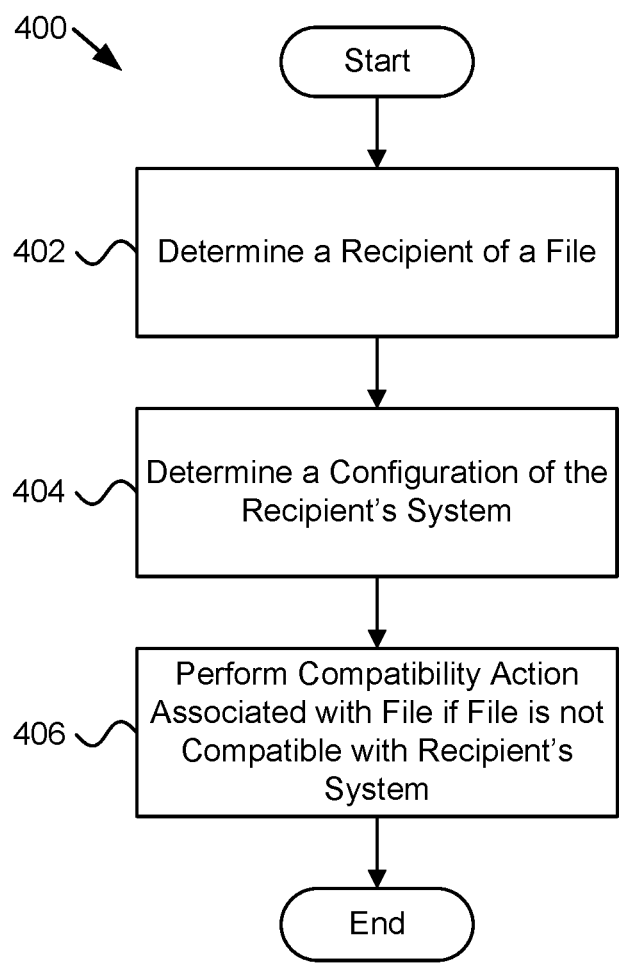
FIG. 4 is a schematic flow chart diagram illustrating one embodiment of a method for file usability based on a system configuration.

FIG. 4 depicts a schematic flow chart diagram of one embodiment of a method 400 for file usability based on a system configuration. In one embodiment, the method 400 begins and determines 402 a recipient of a file. The file, in certain embodiments, is sent from a sender to the recipient. In a further embodiment, the method 400 determines 404 a configuration of the recipient's system. The recipient's system may include a desktop computer, a laptop, a tablet computer, a smart phone, and/or the like. The system configuration may include specifications/settings for hardware, operating systems, software applications, or the like for the recipient's system.

In one embodiment, the method 400 performs 406 one or more compatibility actions associated with the file in response to determining that the file is not compatible with the recipient's system configuration. A compatibility action may be an action related to usability of the file on the recipient's system. In some embodiments, the method 400 performs 406 the compatibility action on the sender's system prior to distributing the file to the recipient, and the method 400 ends. In certain embodiments, the user module 202, the system module 204, and the action module 206 perform the steps of the method 400.

Figure 5:
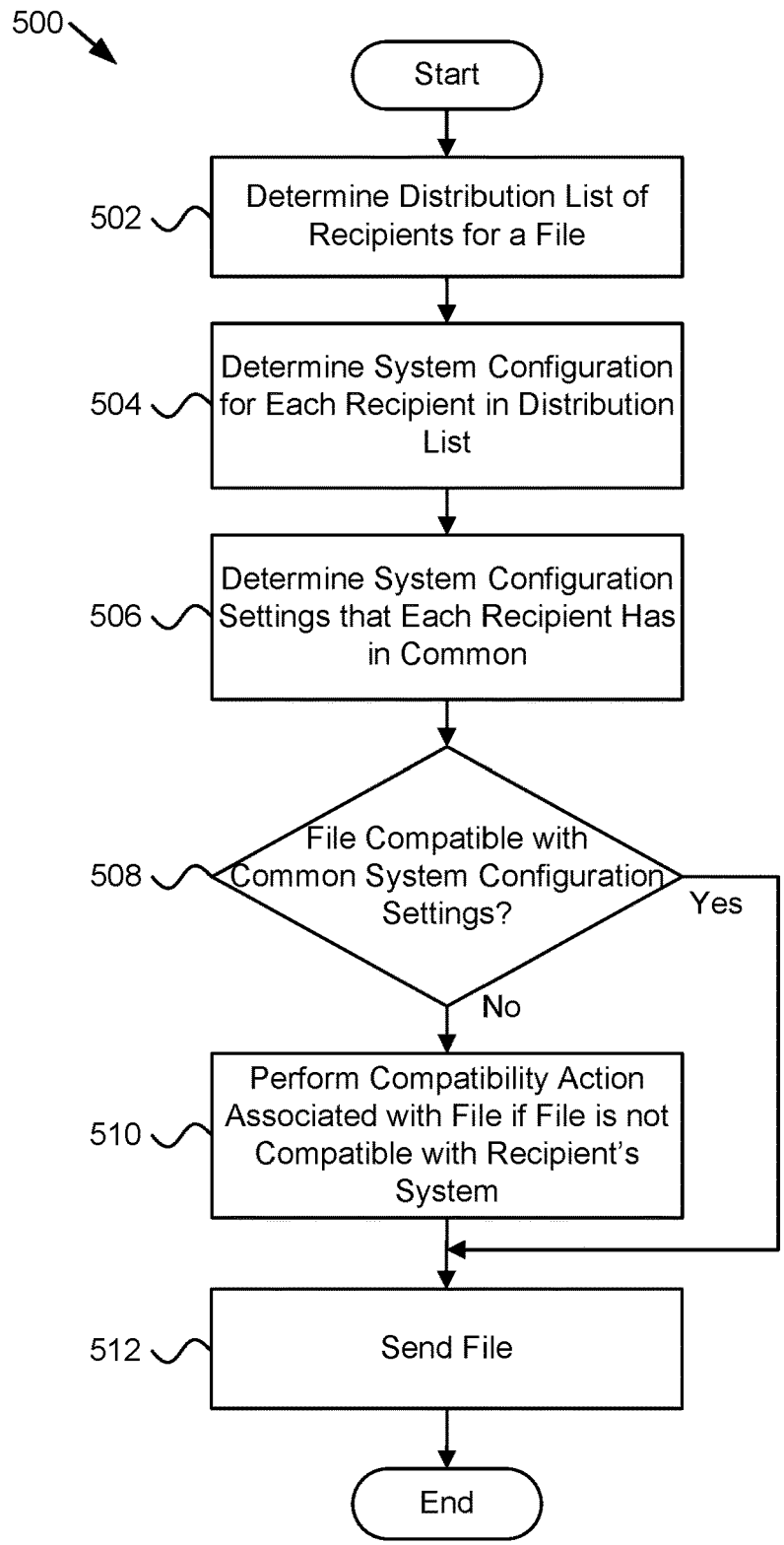
FIG. 5 is a schematic flow chart diagram illustrating one embodiment of another method for file usability based on a system configuration.

FIG. 5 depicts a schematic flow chart diagram of one embodiment of a method 500 for file usability based on a system configuration. In one embodiment, the method 500 begins and determines 502 a plurality of recipients for the file from a distribution list. The method 500, for example, may determine 502 a plurality of recipients for the file from a list of email recipients, an access control list for a shared directory/folder, an active directory group, a user-defined list of recipients, or the like.

The method 500, in a further embodiment, determines 504 a system configuration for each recipient in the distribution list. As described above, the method 500 may request a system configuration report from each recipient on the distribution list (not shown). The method 500, based on each system configuration may determine 506 one or more system configuration settings that each recipient system has in common. For example, each recipient system may have the same version of Microsoft Word® running on Microsoft Windows 7®.

In some embodiments, the method 500 determines 508 whether one or more of the file's settings are compatible with the common system configuration settings between each of the recipients in the distribution list. If so, the method 500 sends 512 the file to the recipients. If not, the method 500 performs 510 one or more compatibility actions associated with the file such that the file is compatible with the common system configuration settings of each of the recipients' systems. The method 500 sends 512 the file, and the method 500 ends. In certain embodiments, the user module 202, the system module 204, the action module 206, and the compatibility module 302 perform the steps of the method 500.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a user module that determines a recipient of a file from a predefined list of one or more intended recipients of the file;
a system module that determines a configuration of the recipient's system; and
an action module that performs one or more compatibility actions associated with the file in response to determining that the file is not compatible with the recipient's system configuration, a compatibility action comprising an action related to usability of the file on the recipient's system, the compatibility action performed on the sender's system prior to the sender distributing the file to the recipient, the compatibility action comprising presenting a notification to the sender that the file is not compatible with the recipient's system configuration,
wherein at least a portion of said modules comprise one or more of hardware circuits, programmable hardware devices, and executable code, the executable code stored on one or more computer readable storage media.

2. The apparatus of claim 1, further comprising a compatibility module that determines whether the file is compatible with the recipient's system configuration, wherein the compatibility module further:
determines one or more characteristics of the file;
determines one or more configuration settings of the recipient's system; and
compares the one or more characteristics of the file with the one or more configuration settings of the recipient's system to determine whether the one or more characteristics of the file is compatible with the one or more configuration settings of the recipient's system.

3. The apparatus of claim 2, wherein the one or more characteristics of the file comprise one or more of formatting settings for content within the file, types of content embedded in the file, and a file extension for the file.

4. The apparatus of claim 2, wherein the one or more configuration settings of the recipient's system comprise one or more of hardware level settings, operating system level settings, application level settings, graphics settings, and network settings.

5. The apparatus of claim 1, wherein the system module determines the configuration of the recipient's system by one or more of:
requesting a configuration report from the recipient's system;
checking a recipient configuration profile associated with a directory service; and
checking a history of file distributions associated with the recipient.

6. The apparatus of claim 1, wherein the user module determines the recipient by checking one or more of:
a list of previously selected recipients;
an email recipient list;
an access control list associated with a shared folder where the file is stored;
a user-generated list;
a predefined contacts group associated with the sender; and
an organization group defined by a directory service.

7. The apparatus of claim 1, wherein the recipient is one of a plurality of intended recipients for the file, the system module further determining one or more system configuration settings that are common for each recipient of the plurality of intended recipients, the one or more common configuration settings used to determine one or more compatibility actions to perform on the file to make the file compatible with each of the intended recipients' systems.

8. The apparatus of claim 1, wherein the compatibility action comprises modifying one or more of formatting settings for content within the file, types of content embedded in the file, and a file extension of the file to make the file usable on the recipient's system.

9. The apparatus of claim 1, wherein the compatibility action comprises creating a plurality of different versions of the file, a version of the file corresponding to a version of a software application on the recipient's system used to access the file.

10. The apparatus of claim 1, wherein the compatibility action comprises presenting one or more recommendations for modifying one or more characteristics of the file to make the file compatible with one or more configuration settings of the recipient's system.

11. The apparatus of claim 10, wherein the one or more recommendations for modifying the one or more characteristics of the file to make the file compatible with the one or more configuration settings of the recipient's system are presented in real-time while the sender edits the file.

12. The apparatus of claim 1, wherein the action module performs the compatibility action in response to one or more of the sender editing the file, the file being saved, the file being attached to an email, and an email that the file is attached to being sent.

13. A method comprising:
determining, by use of a processor, a recipient of a file from a predefined list of one or more intended recipients of the file;
determining a configuration of the recipient's system; and
performing one or more compatibility actions associated with the file in response to determining that the file is not compatible with the recipient's system configuration, a compatibility action comprising an action related to usability of the file on the recipient's system, the compatibility action performed on the sender's system prior to the sender distributing the file to the recipient, the compatibility action comprising presenting a notification to the sender that the file is not compatible with the recipient's system configuration.

14. The method of claim 13, further comprising determining whether the file is compatible with the recipient's system configuration by:
determining one or more characteristics of the file;
determining one or more configuration settings of the recipient's system; and
comparing the one or more characteristics of the file with the one or more configuration settings of the recipient's system to determine whether the one or more characteristics of the file is compatible with the one or more configuration settings of the recipient's system.

15. The method of claim 13, wherein determining the configuration of the recipient's system comprises one or more of:
requesting a configuration report from the recipient's system;
checking a recipient configuration profile associated with a directory service; and
checking a history of file distributions associated with the recipient.

16. The method of claim 13, wherein the compatibility action comprises modifying one or more of formatting settings for content within the file, types of content embedded in the file, and a file extension of the file to make the file usable on the recipient's system.

17. The method of claim 13, wherein the compatibility action comprises creating a plurality of different versions of the file, a version of the file corresponding to a version of a software application on the recipient's system used to access the file.

18. A program product comprising a computer readable storage medium that stores code executable by a processor, the executable code comprising code to perform:
  determining a recipient of a file from a predefined list of one or more intended recipients of the file;
  determining a configuration of the recipient's system; and
  performing one or more compatibility actions associated with the file in response to determining that the file is not compatible with the recipient's system configuration, a compatibility action comprising an action related to usability of the file on the recipient's system, the compatibility action performed on the sender's system prior to the sender distributing the file to the recipient, the compatibility action comprising presenting a notification to the sender that the file is not compatible with the recipient's system configuration.

* * * * *